(12) United States Patent
Agrawal et al.

(10) Patent No.: US 10,366,440 B2
(45) Date of Patent: Jul. 30, 2019

(54) MONITORING CONSUMER-PRODUCT VIEW INTERACTION TO IMPROVE UPSELL RECOMMENDATIONS

(71) Applicant: ADOBE INC., San Jose, CA (US)

(72) Inventors: Suryadeep Kumar Agrawal, Bangalore (IN); Sachin Soni, New Delhi (IN); John Thomas Kucera, San Jose, CA (US); Ashish Duggal, Delhi (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 533 days.

(21) Appl. No.: 14/925,555

(22) Filed: Oct. 28, 2015

(65) Prior Publication Data
US 2017/0124624 A1    May 4, 2017

(51) Int. Cl.
*G06Q 30/02* (2012.01)
*G06Q 30/06* (2012.01)

(52) U.S. Cl.
CPC ..... *G06Q 30/0631* (2013.01); *G06Q 30/0201* (2013.01); *G06Q 30/0643* (2013.01)

(58) Field of Classification Search
CPC ................................................. G06Q 30/0631
See application file for complete search history.

(56) References Cited

U.S. PATENT DOCUMENTS

| | | | | |
|---|---|---|---|---|
| 6,981,040 B1* | 12/2005 | Konig | ............... | G06F 17/30867 707/E17.109 |
| 7,921,071 B2* | 4/2011 | Hicks | ................. | G06Q 30/0269 706/52 |
| 9,177,225 B1* | 11/2015 | Cordova-Diba | .......... | G06T 5/00 |
| 2008/0082463 A1* | 4/2008 | Cheng | .................... | G06N 7/005 706/12 |
| 2012/0109966 A1* | 5/2012 | Liang | ................ | G06F 17/30873 707/740 |
| 2015/0073931 A1* | 3/2015 | Ronen | ................ | G06Q 30/0631 705/26.7 |
| 2015/0095202 A1* | 4/2015 | Subramanya | ........ | G06Q 10/087 705/28 |
| 2015/0227972 A1* | 8/2015 | Tang | .................. | G06Q 30/0255 705/14.53 |
| 2015/0286898 A1* | 10/2015 | Di | ........................... | G06K 9/46 382/224 |

OTHER PUBLICATIONS

Chen, Li; Pu, Pearl. Behaviour & Information Technology. "Experiments on user experiences with recommender interfaces" Apr 2014, vol. 33 Issue 4, pp. 372-394. (Year: 2014).*

* cited by examiner

*Primary Examiner* — Michael Misiaszek
*Assistant Examiner* — Jason B Warren
(74) *Attorney, Agent, or Firm* — Shook, Hardy & Bacon, L.L.P.

(57) ABSTRACT

In various implementations, a visual representation of a product is presented to an online consumer. The visual representation can have one or more regions that are each associated with one or more feature tags associated with a particular category of the product. While the consumer interacts with the visual representation, interaction times between the consumer and the product's visual representation are monitored and measured to determine which features of the product appear to be of particular interest to the consumer. Based on the monitored interaction times, product upsell recommendations associated with the same category of the product are generated and presented to the user.

17 Claims, 8 Drawing Sheets

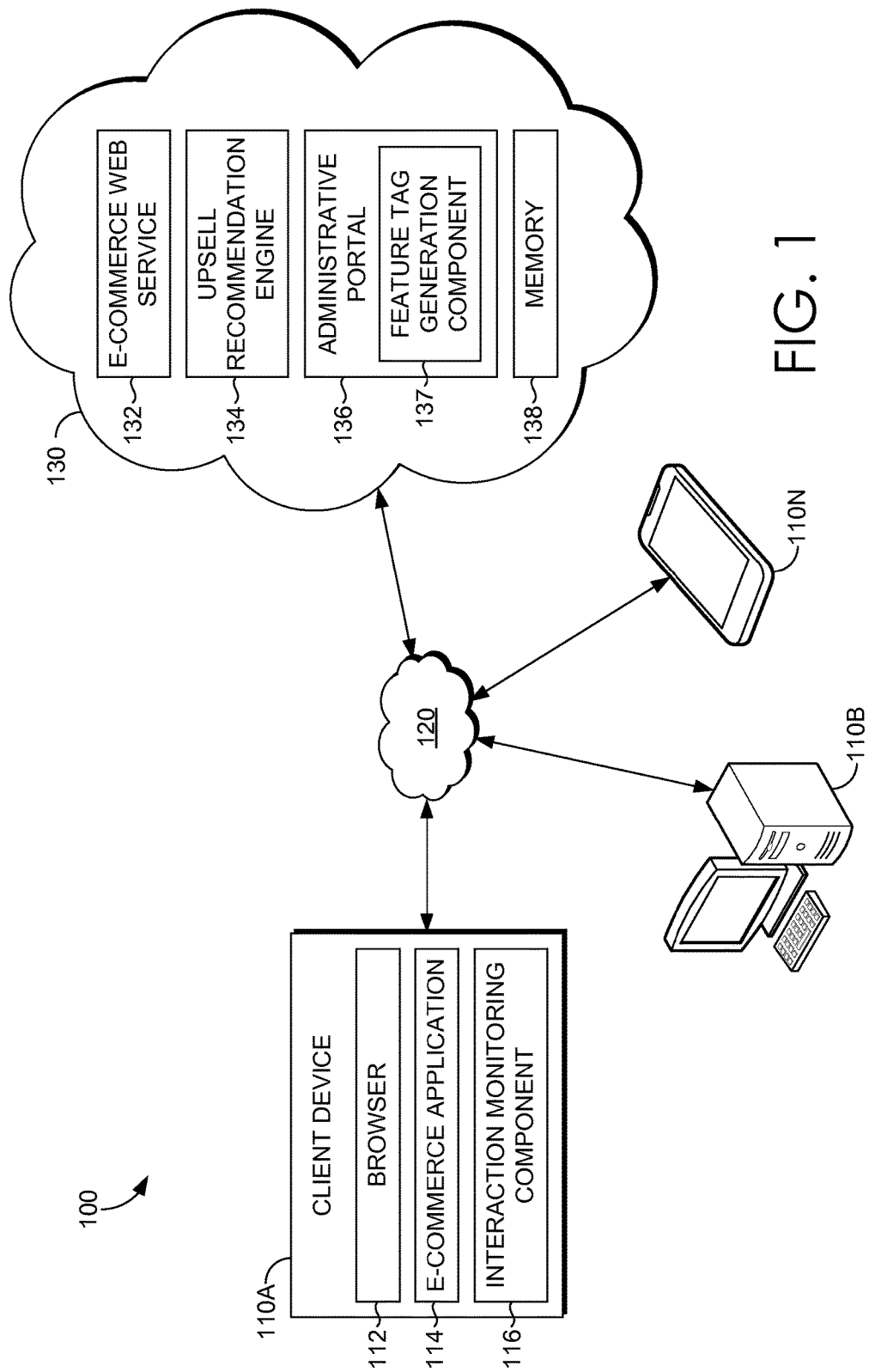

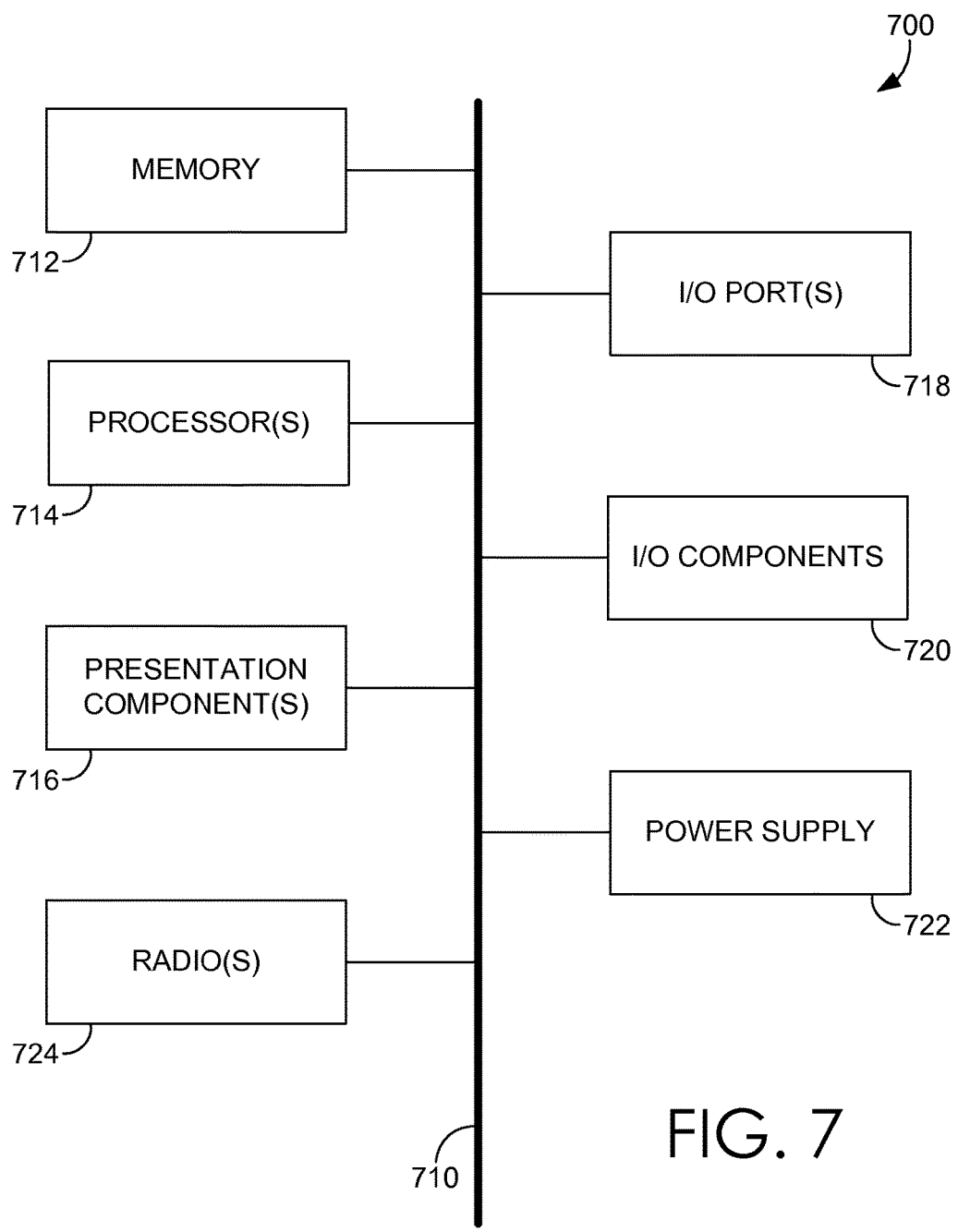

MONITORING CONSUMER-PRODUCT VIEW INTERACTION TO IMPROVE UPSELL RECOMMENDATIONS

BACKGROUND

Statistics have shown that upsell recommendations in online retail applications drive a substantial percentage of total online sales. By monitoring the browsing patterns of online consumers, retailers have capitalized on the opportunity to upsell higher-margin products by presenting upsell recommendations to consumers while they are actively browsing the retail site. Retail websites and applications oftentimes rely on recommendation engines to upsell or cross-sell merchandise to consumers. These recommendation engines typically take into consideration purchase trends, browsing trends, and other historically-gathered data, but do not take into account the particular features of a product a consumer is interested in. While these known techniques have proven to be somewhat effective in generating additional revenue for online retailers, the ability to generate upsell recommendations particularly geared towards a consumer's interests in specific product features would be very beneficial.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein are directed to improving upsell recommendations to online consumers using consumer-product interaction data. In essence, embodiments are directed to collecting consumer-product interaction data by monitoring, in real-time, the duration that a consumer views specific features of a product, and using the collected data to update a set of recommended products that have an increased likelihood of having similar features-of-interest to the consumer. In this way, if a consumer demonstrates interest in finding a product having specific characteristics or features, the upsell recommendations generated and presented by the retailer's website or application will have similar characteristics or features-of-interest to the consumer.

At a high level, a visual representation of a product can have one or more tagged regions that each encompass a particular feature of the product. The regions are tagged with feature tags that are each associated with the category of the product. When the visual representation of the product is provided for display to a consumer, dynamic code in the medium on which the product is displayed can be configured to monitor how long the consumer views each feature of the product. The time that the consumer interacts with each feature can be measured, for instance, by a duration that the consumer zooms in on a particular feature. Based on the time spent by the consumer on each particular feature of the product, upsell recommendations also associated with the category of the product are generated and/or modified to include similar features-of-interest demonstrated by the consumer's interactions with the various features.

BRIEF DESCRIPTION OF THE DRAWINGS

The present invention is described in detail below with reference to the attached drawing figures, wherein:

FIG. 1 is a diagram illustrating an exemplary system in accordance with implementations of the present disclosure;

FIG. 7 is a block diagram of an exemplary computing environment suitable for use in implementations of the present disclosure.

DETAILED DESCRIPTION

Figure 2A:
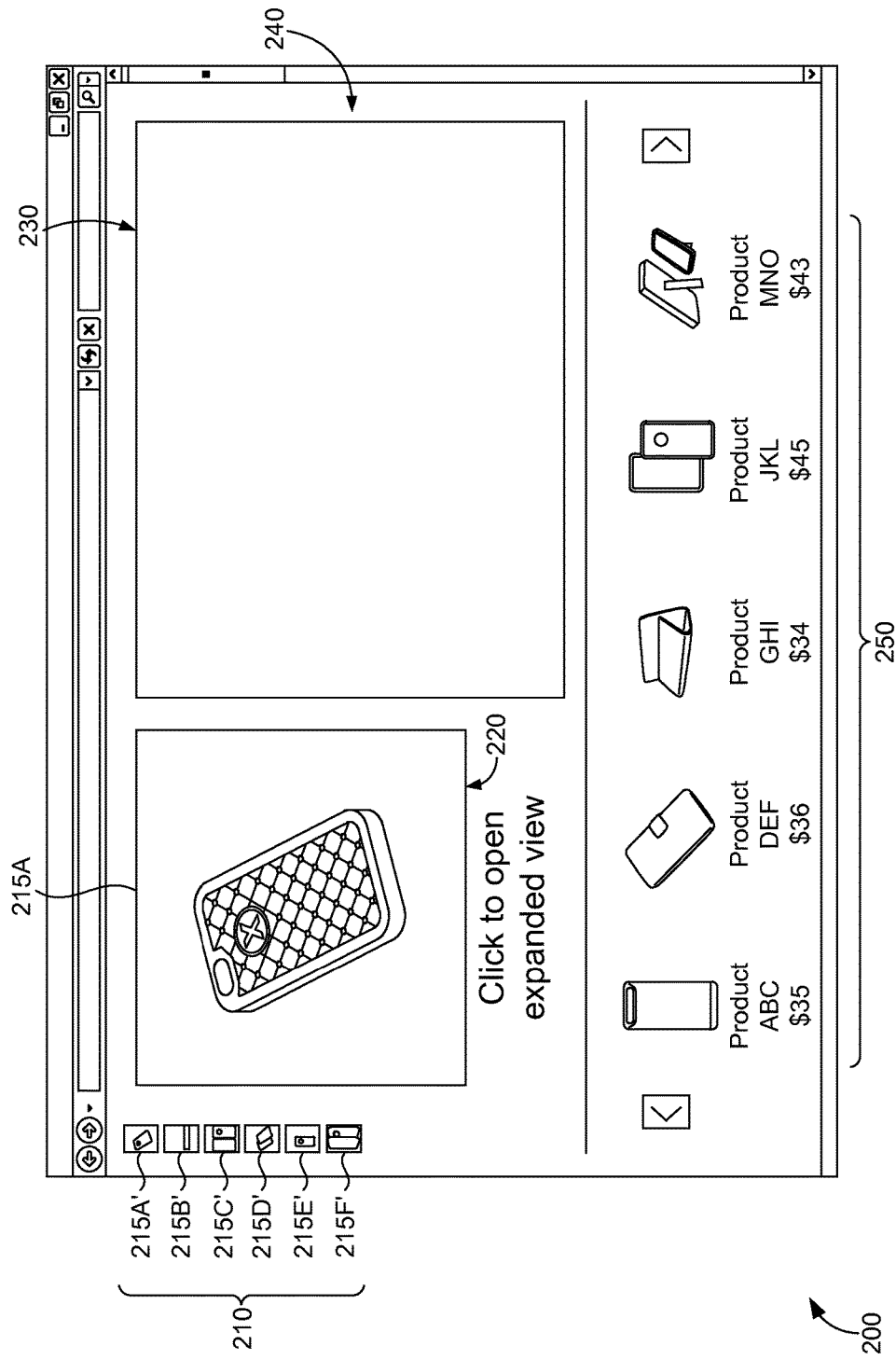
FIGS. 2A-2C illustrate exemplary user interfaces of an e-commerce application in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Retail websites and applications oftentimes rely on recommendation engines to generate upsell or cross-sell recommendations to consumer users (hereinafter also referred to as "consumers" or "users") with hopes of improving sales and increasing revenue. Upselling is commonly known in the art as a sales strategy that encourages customers to purchase a more expensive product in the same product family, or to augment a product of interest with more expansive features. Cross-selling is also a commonly known sales strategy that entices a customer to supplement an initial purchase with products that complement it. While both upselling and cross-selling have proven to be effective techniques for boosting sales revenues, upselling has proven to be much more effective in click and conversion performance. As such, the ability to optimize upselling performance on retail websites and applications is highly desirable.

Traditional upsell recommendation engines use limited algorithmic logic that focuses primarily on static and/or historical data. For example, if a consumer is viewing a product made by a particular manufacturer, some upsell recommendation engines may simply recommend higher-priced products from the same manufacturer, or in some instances, may recommend higher-priced products from other manufacturers. In another example, some upsell recommendation engines will merely analyze historical sales data to recommend popular higher-priced products within the same product category. These traditional recommendation engines are limited, however, because the data from which upsell recommendations are generated can be stale and irrelevant to the consumer. Accordingly, it would be very beneficial to consider the actual features-of-interest relevant to the consumer when determining upsell recommendations, or even recommendations generally, for presentation to the consumer.

As such, embodiments described herein are directed to improving upsell recommendations to consumers using consumer-product interaction data. Some embodiments, also described herein, are directed to improving recommendations (not limited to upselling) to consumers using the consumer-product interaction data. Retail websites and applications can showcase products and their features by displaying one or more visual representations of the products in different views, formats, angles, technologies, and media types. Visual representations, as will be referenced herein, can include images, three-dimensional models, videos, virtual reality demonstrations, and the like. In various embodiments, visual representations of products can be viewed alone, or manipulated (e.g., zoomed in, rotated, flipped, paused, etc.), to focus on any one or more particular features. In viewing products, consumers can demonstrate their interest in particular features of a product by spending time viewing features of the product that are of particular interest to them. By way of example, if a consumer was specifically looking for a cell-phone case decorated with rhinestones, the consumer might find a product page for a candidate product and spend more time viewing zoomed-in images that particularly showcase the rhinestones, or in another instance, spend more time particularly viewing the rhinestones using zoomed-in portions of images showcasing the entire case. By monitoring and collecting this consumer-product interaction data on the product feature level (i.e., measuring the amount of time the consumer spends looking at particular product features), recommendations, particularly upsell recommendations, can be tailored to show more products that include features that are of apparent interest to the consumer, as will be described herein in more detail.

Generally, a visual representation of a product can be presented to a consumer on a retail webpage or application. The visual representation can be designated with various regions that are each associated with features tag(s) specific to the category of the product. While provided for presentation to the consumer, embodiments can monitor and receive consumer interaction times associated with the various feature-tagged regions. Product recommendations can be generated and/or modified based on the monitored interaction times associated with each of the feature-tagged regions of the visual representation.

To associate the various regions of a product's visual representation with feature tag(s), the feature tag(s) for the product's category must be made available to an operator for associating the tag(s) with the various regions. In some cases, feature tags belonging to a category of a product can be received by a retail webpage, application, or a portal thereof. More specifically, feature tags can be provided in the form of administrator (e.g., operator or marketer) inputs. The feature tags can then be assigned (i.e. by the administrator) to various regions of a visual representation of the product. While the visual representation is presented to a consumer, embodiments can monitor consumer interaction times associated with each of the feature-tagged regions. Product recommendations of the same category can be generated and/or modified based on the monitored interaction times associated with each of the feature-tagged regions of the visual representation.

In some other cases, the feature tags can be generated using a natural language processing engine. The natural language processing engine can be configured to generate the feature tags by identifying keywords from product pages associated with the same product category, as will be described in more detail. A visual representation of a product and operator-defined boundaries, as was described, can be received by a retail webpage, application, or a portal thereof. The feature tags can then be associated to the various regions. While the visual representation of the product is presented to a consumer, embodiments can monitor consumer interaction times associated with the various regions of the visual representation. Product recommendations associated with the category of the product can be generated and/or modified based on the monitored interaction times associated with each of the feature-tagged regions of the visual representation.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-server system or a server-only system that can be utilized to improve upsell recommendations to consumers using consumer-product interaction data. While references to "upsell" recommendations are made throughout the present disclosure, it is contemplated that recommendations generated by way of embodiments described herein are not limited to upselling, and can be applied to improving general recommendations (i.e., for similarly priced and lesser-priced items) for improved consumer conversion. Among other components not shown, the system 100 can include any number of client devices, such as client devices 110a and 110b through 110n, network 120, and one or more remote server devices 130. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 700, later described with reference to FIG. 7, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110a and 110b through 110n are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110a and 110b through 110n can include one or more processors, and one or more computer-readable media. The computer-readable media may include computer-readable instructions executable by the one or more processors. The instructions may correspond to one or more applications, such as browser 112 and/or e-commerce application 114, shown on client device 110a.

Browser 112, such as a web browser, can be an HTTP-compatible application (e.g. an Application that supports an HTTP protocol). A specific example of browser 112 is a Google® Chrome® web browser. E-commerce application 114 may be independently installed on the client device as a standalone application, or can be accessed through a web-based application hosted by server 130 or other server(s) (not shown) and accessible to client devices by the browser 112. A specific example of an e-commerce application 114 is the Amazon® Shopping app. In some instances, the e-commerce application 114 is accessible over the web (e.g., an e-commerce website or a cloud-based web application) through the browser 112. Accessing the e-commerce application 114 over the web can be accomplished on the client 110a by visiting a Uniform Resource Identifier (URI or URL) to receive code (e.g., HTML) for rending, the code being dynamically generated by the server 130 and communicated to the client 110a over the network 120.

In some embodiments described herein, the e-commerce application 114, both in the standalone and web application embodiments, can interface with an interaction monitoring component 116 configured to monitor and/or measure real-time consumer interaction times. Generally, consumer interaction times are associated with one or more feature-tagged regions of product images or other corresponding visual representations. In more detail, the interaction monitoring component 116 can be embodied in executable code operable to detect an area of a consumer's focus on a visual representation of a product. For instance, dynamic code (e.g., JavaScript® under the AJAX® framework) on a webpage may be configured to monitor and/or measure, among other things, the amount of time a consumer is zooming in on any one particular area of an image or model, the amount of time a consumer is viewing a particular image or model, and/or the amount of time a consumer is viewing any one particular frame of a video (e.g., when paused). A standalone application may include integrated code that may be configured to monitor the same. While in practice, the interaction monitoring component 116 in the standalone application and the web application function substantially the same, the web application embodiment is delivered from the server 130 to a browser 112 of the client device 110a and executed on the client device 110a upon rendering a webpage comprising the relevant code.

The interaction monitoring component 116 can also be configured to communicate the measured data (e.g., consumer-product interaction times) to the server 130 over the network 120. The measured data can be communicated from the client 110a to the server 130 in real-time, in predetermined intervals, or programmatically (e.g., when HTTP requests are made). In one aspect, the measured data can be communicated from the client 110a to the server 130 as soon as a measurement is collected, or in other words, as soon as a consumer breaks focus from a particular region of a product's visual representation. In another aspect, the measured data can be communicated from the client 110a to the server 130 in predetermined intervals, such as, by way of example only, every ten seconds so long as no measurements are being made. In another aspect, the measured data can be communicated from the client 110a to the server 130 programmatically, for instance, whenever the consumer clicks on a URL or requests additional information from the server 130. In embodiments, the measured data can include, among other things, a measured duration of the consumer's focus, a product identifier, an identifier associated with the visual representation of the product, coordinates associated with the consumer's focus on the visual representation, one or more feature tags associated with the consumer's focus on the visual representation, an identifier associated with a region on the visual representation subject to the consumer's focus, and/or the like.

The e-commerce application 114 is configured to communicate with one or more servers, such as server 130, via network 120, which may comprise the Internet. As illustrated, server 130 can include one or more server computing device(s) comprising an e-commerce web service 132, an upsell recommendation engine 134, an administrative portal 136, and a memory 138. The server 130 can include a plurality of computing devices configured in a networked environment, or can include a single computing device hosting each of the e-commerce web service 132, upsell recommendation engine 134, administrative portal 136, and memory 138. Each server computing device can include one or more processors, and one or more computer-readable media. The computer-readable media may include computer-readable instructions executable by the one or more processors. The instructions may correspond to one or more applications, such as e-commerce web service 132, upsell recommendation engine 134, or administrative portal 136, shown on server device 130. The server 130 can be configured to store, among other things, a plurality of products, corresponding product pages, and one or more corresponding visual representation(s) for each product in a memory 138. The memory 138 can further be configured to store a set (e.g., a collection or array) of upsell recommendations comprised of one or more of the plurality of products available in memory 138.

As will be described, the set of upsell recommendations can be generated at least in part by upsell recommendation engine 134. Memory 138 can be comprised of one or more computer-readable media, or may comprise one or more database(s) (not shown) for storing data, as can be appreciated by one of ordinary skill in the art. As will be referenced herein, "products" refers to consumer goods or services that can be presented to a consumer for purposes of sale, using visual representations thereof, by a retailer on an application or webpage. The term "product" may reference the product itself, or the visual representation of the product, when referenced throughout the present disclosure.

The e-commerce web service 132 can comprise a web server, such as Apache®, IIS®, Nginx®, or GWS®, among many others, and can be configured to communicate over the network 120 to provide an electronic shopping experience to consumers on a client device via browser 112 or e-commerce application 114. While the standard network protocol for communication is HTTP, it is contemplated that any network protocol can be used to distribute information between the e-commerce web service 132 and the e-commerce application 114 of client device 110*a*. In more detail, if the e-commerce application 114 is communicated to the client device 110*a* over the World Wide Web and accessed via browser 112, the e-commerce web service 132 can be configured to provide HTML webpages, or the like, to consumers for browsing an online retail store and viewing product pages in more detail. If the e-commerce application 114 is a standalone application installed on the client device 110*a*, and is configured to communicate with the e-commerce web service 132 over network 120 (e.g., the Internet), the e-commerce web service 132 can be configured to provide framework data (e.g., XML documents) and content data (e.g., visual representations and product information) for rendering by the e-commerce application 114 so that consumers can also browse and view product pages.

The e-commerce web service 132 can also be configured to provide an administrative portal 136, providing limited administrative access to one or more administrators or marketers (herein also referred to as an "operator") of a particular brand or product. The administrative portal can be presented to the operator by webpage or application, delivered similarly to that of the e-commerce application. The administrative portal can be configured to provide operator(s) with limited access to the "backend" of the website, or in other words, providing marketers with write access to the operator's product offerings available via the e-commerce web service 132.

The administrative portal 136 can provide instructions or code that facilitate the operator's ability to upload, to the server 130, visual representations of one or more products and corresponding product information in the form of product pages (e.g., web pages with detailed descriptions), pricing information, and product feature taxonomies, as will be described. The administrative portal 136 can also be configured to provide operators with a user interface for dividing each visual representation of the one or more products into unique regions. In other words, an operator user interface can provide controls for drawing regions or boundaries (e.g., a box) around particular features depicted in a product image or model for association with one or more feature tags selected from the product feature taxonomy, as will be described.

In some embodiments, the administrative portal 136 can further be configured to receive product feature taxonomies manually entered by an operator or automatically generated by a feature tag generation component 137. As such, one or more product feature taxonomies can be manually input or uploaded (e.g., in a text document) by an operator. As referenced herein, a product feature taxonomy is a collection of keywords, typically nouns, that have high relevance to a particular category of a marketer's products. In other words, a product feature taxonomy is a plurality of words that is product category-specific, each having some relevance to a feature that is common to products in the particular product category. As will be described, the product feature taxonomy can be used as a library of keywords, from which various features of a product can be tagged.

Additionally or alternatively, one or more product feature taxonomies can be automatically generated, for instance, by feature tag generation component 137. In some embodiments, the feature tag generation component 137 can be provided as a feature of the administrative portal 136. In other embodiments, the feature tag generation component 137 can be accessible via the administrative portal 136, but configured as a separate component in e-commerce web service 132 or server 130. In operation, the feature tag generation component 137 can be configured to analyze one or more product pages associated with one or more manufacturers or marketers, and generate a product feature taxonomy therefrom. In more detail, a marketer can upload content comprising descriptions from a plurality of products (e.g., a plurality of product pages) that all correspond to a particular product category. Once the product pages are uploaded, the feature tag generation component 137 can process the one or more product pages through a natural language processing engine (not shown), the natural language processing engine being trained using a domain-specific or vertical-specific dictionary to identify a ranking of common words found in the product pages. When embodiments of the natural language processing engine are trained using a domain/vertical-specific dictionary, it is contemplated that keywords that are particularly relevant to the marketer's product domain are extracted and ranked. By identifying and ranking important keywords in the marketer's descriptions or product pages, a product feature taxonomy is generated including the identified keywords. By way of example, for a marketer specializing in selling decorated cell phone cases (e.g., cell phones encrusted in crystals, rhinestones, diamonds, etc.), a relevant product feature taxonomy for category "cell phone cases" may include keywords such as "crystal," "rhinestone," or "diamond." The product feature taxonomy, as will be described, can be used by the operator to tag various features depicted on a product's visual representation.

In embodiments, once a product feature taxonomy is received by administrative portal 136 (e.g., received as input or automatically determined), it can be stored in memory 138 for use by the administrative portal 136, e-commerce web service 132, and upsell recommendation engine 134, as will be described. The operator can further employ the administrative portal 136 to upload one or more visual representations of a product associated with the particular category. As was described, visual representations may include product images, three-dimensional models, videos, and the like.

The administrative portal 136 can be further configured to provide a user interface to the operator, configured to receive operator inputs that define one or more regions of each visual representation. It is contemplated that each region is purposefully defined by the operator to highlight various features of the product. The user interface can be configured to receive an input, such as a shaped boundary, or a click-and-drag or cursor-drawn region, around each of one or more features of a product. Such operator-defined boundaries are generally intended by the marketer operator to define which portions of a product's visual representation should be associated with a particular feature. For example, if an operator uploaded an image of a cell phone case decorated with rhinestones, one of the important features of the cell phone case might be the rhinestone-decorated portion(s) of the cell phone case. In this regard, the operator can define a region around the rhinestone-decorated portion(s)

and associate the relevant region(s) with one or more tags selected from the product feature taxonomy. In this regard, the tag "rhinestone," among any other relevant tags, can be selected from the product feature taxonomy by the operator for association with the rhinestone-decorated portion(s) of the cell phone case.

In some embodiments, the visual representation can be a video or other animated multimedia file displaying one or more features of a product. In this regard, the administrative portal 136 can be configured to receive operator inputs that define a start time and an end time of the video or multimedia file that portrays the relevant feature. In the same way, the features depicted in the frames between the start time and end time of the visual representation can define a region, which can then be associated with one or more product feature tags selected from the product feature taxonomy.

Provided the foregoing, the upsell recommendation engine 134 is configured to determine which product features a consumer is focused on, and further select product recommendations that correspond with those features. In more detail, the upsell recommendation engine 134 is configured to reference consumer-product interaction data monitored on a consumer's client device 110a (for instance, through interaction monitoring component 116). As the interaction monitoring component 116 collects measured data and communicates the data to the server 130, as was described herein above, the upsell recommendation engine 134 can reference the data to analyze how much time the consumer, and in some instances other consumers, spent focusing on the various features of the product.

In some embodiments, the upsell recommendation engine 134 can be configured to generate upsell product recommendations solely based on the real-time collected measured data. The upsell recommendation engine 134 can, for instance, determine one or more features having apparent importance to a consumer by, for instance, ranking and selecting the features based on the amount of time spent focusing on each feature. Moreover, the upsell recommendation engine 134 can search the product database for other products, preferably within the same product category, having the same features of apparent importance to the consumer. For example, if a consumer is focusing most of their time on a rhinestone-encrusted portion of a cell phone case, the upsell recommendation engine 134 can use this data to generate upsell recommendations of cell phone cases also having rhinestone-encrusted portions as a feature thereon.

In some other embodiments, the upsell recommendation engine 134 can be configured to generate upsell product recommendations based on the real-time collected measured data in addition to historical data stored on the server 130. Historical data may include, by way of example only, best-selling products in the same product category, highly-viewed products in the same category, and other consumers' master marketing profiles, as will be discussed. The upsell recommendation engine 134 can be configured to factor in at least the real-time collected measured data when generating upsell product recommendations for communication back to the client device 110a and presentation to the consumer via the e-commerce application 114.

The upsell recommendation engine 134 can also be configured to modify product pages of the generated upsell product recommendations. In more detail, the upsell recommendation engine can generate product recommendations, as was described, and further modify descriptions and/or formatting of the product pages to highlight the feature(s) of apparent importance to a consumer. By way of example only, if a particular feature such as rhinestones is determined to be of high importance to a consumer based on the collected measured data, a subsection within each upsell recommendation product page description discussing the rhinestone feature may be moved to the top of or highlighted portion of the product page with hopes of grabbing the attention of the consumer.

As was briefly described above, although embodiments described herein reference an "upsell" recommendation engine 134, it is contemplated that the upsell recommendation engine 134 can be alternatively configured to operate as a conventional recommendation engine (not shown), for generating non-exclusive (i.e., higher-priced, similarly priced, and/or lower-priced) product recommendations employing the same configurations described herein above. For instance, the conventional recommendation can generate a set of product recommendations based on real-time collected measured data alone, real-time collected measured data in addition to historical data stored on the server 130, or also be configured to modify product pages of the generated product recommendations.

Figure 2B:
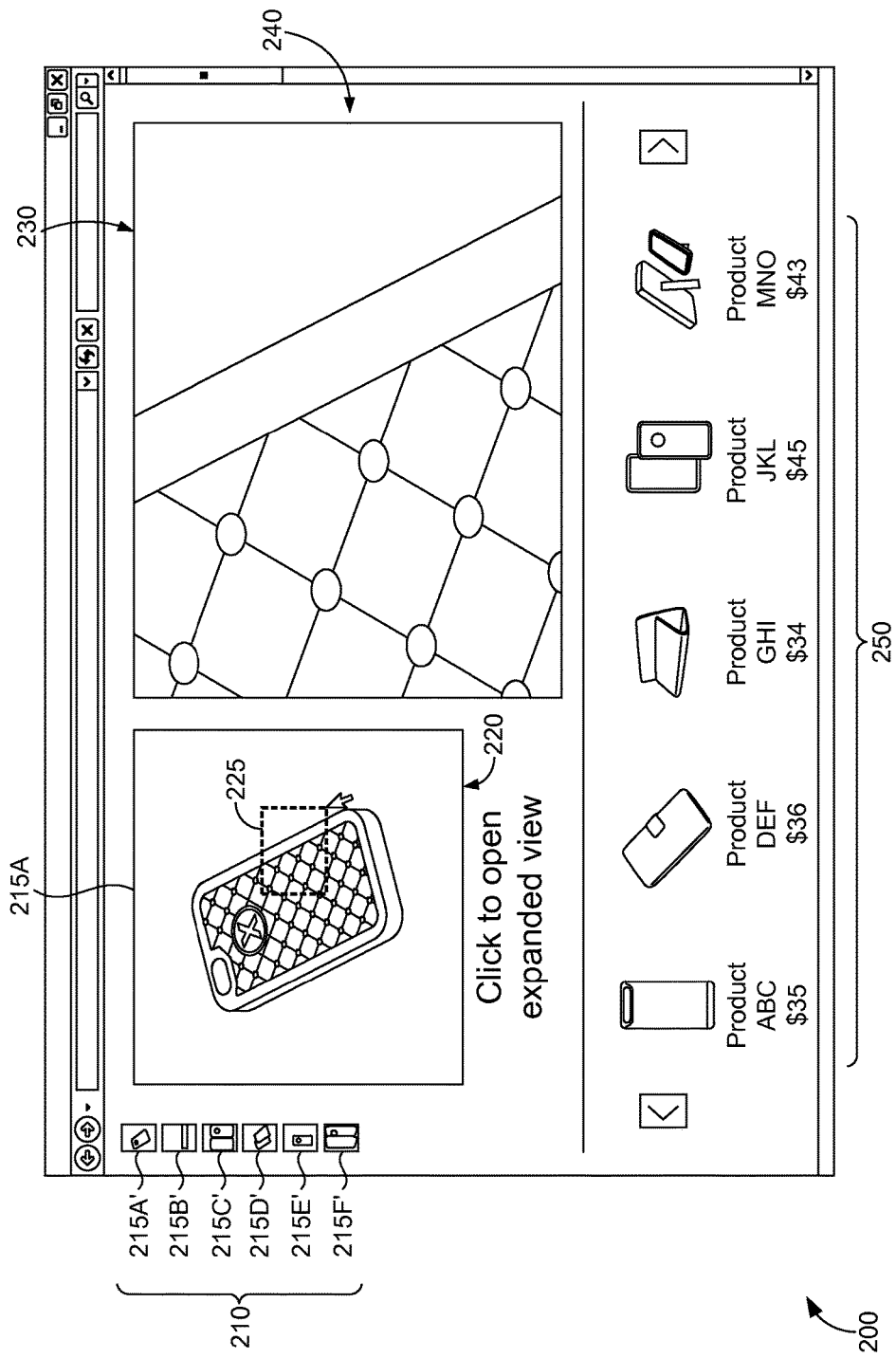
Figure 2C:
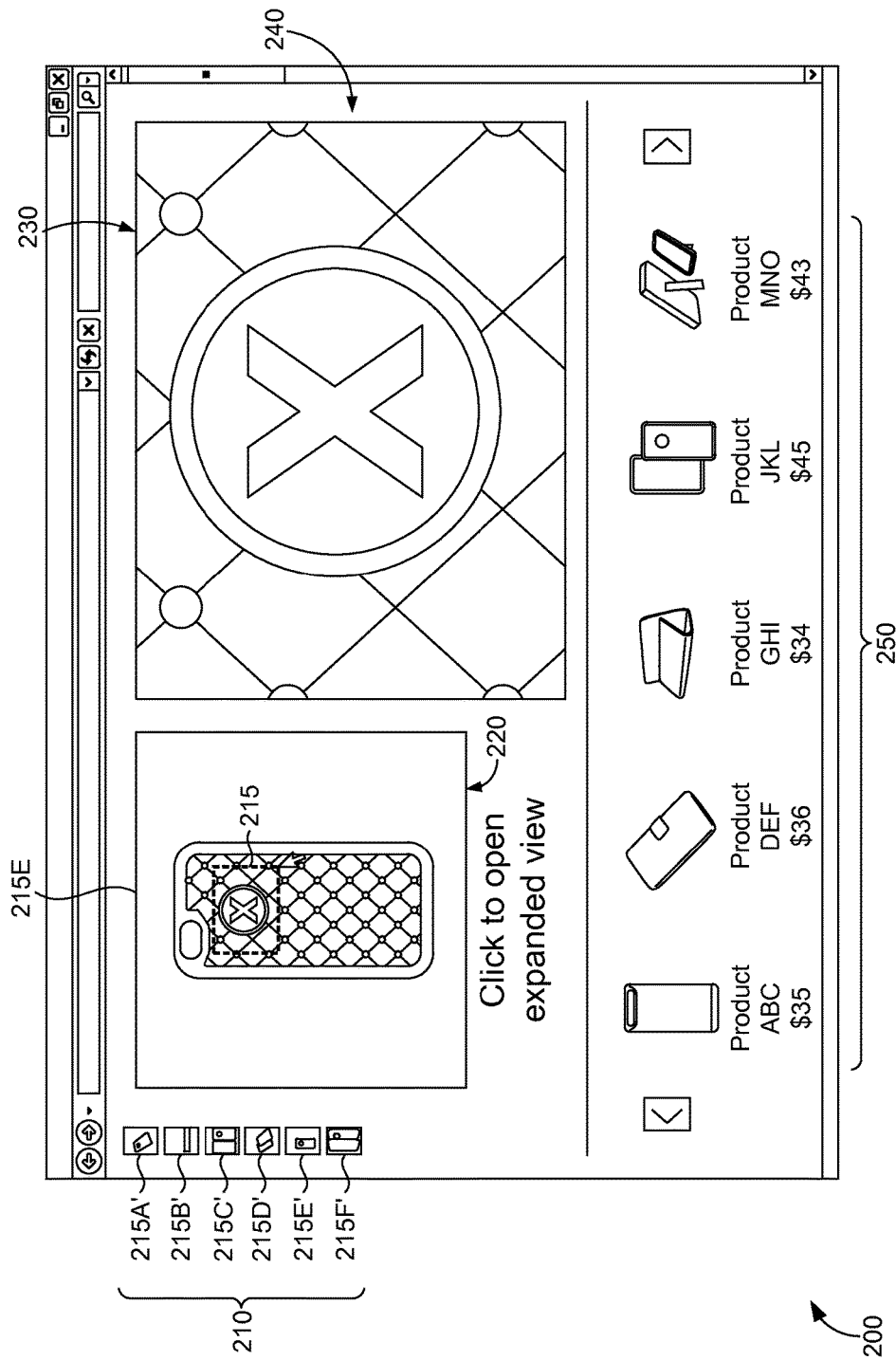

Moving now to FIGS. 2A-2C, an exemplary product page in accordance with embodiments of the present disclosure is provided. In the illustrated product page 200, only some aspects relevant to the following discussion are depicted. As such, a product description including detailed information about the product is not illustrated to simplify the foregoing discussions. It is contemplated, however, that product pages can include product descriptions detailing various technical details and specifications of the products. In the product page 200, a thumbnail array 210 comprising thumbnails 215a'-215f' of a plurality of corresponding visual representations 215a-215f (not currently shown) of an exemplary product is provided alongside an enlarged view 220 of the visual representation of a consumer-selected thumbnail. Also positioned on the product page 200 is a zoomed view 230 that is configured to appear or update when a consumer wishes to expand or zoom in on at least a portion of the enlarged view 220. Positioned below the visual representation portion 240 of the product page 200, a set of upsell recommendations 250 is provided and presented to a consumer. The illustrated configuration is merely exemplary and not intended to be limiting. It is contemplated that the positioning of such modules can vary and, in some embodiments, may not include all of the illustrated modules. For instance, it is possible that the zoomed view 230 is not a separate view, but a dynamic zoomed-in layer positioned in front of the enlarged view 220. Further, it is possible that zooming is not available on certain visual representations, and as such, viewing of an enlarged view 220 alone is equivalent to viewing a zoomed view 230 of a visual representation of a product.

With particular reference to FIG. 2A, thumbnail 215a' selected by a consumer can facilitate the presentation of an enlarged visual representation 215a within enlarged view 220. In the illustrated example, the enlarged visual representation 215a within enlarged view 220 depicts in greater detail some of the features relevant to the product, in this instance, the finish and decorations of the cell phone case.

With reference now to FIG. 2B, illustrated as an exemplary embodiment once again, thumbnail 215a' selected by the consumer facilitates the presentation of the enlarged visual representation 215a within enlarged view 220. As illustrated, the enlarged visual representation 215a within enlarged view 220 depicts in greater detail some of the features relevant to the product, in this instance, the rear side of the cell phone case having decorations (e.g., rhinestones) of the cell phone case. The illustrated example also shows a zoom tool 225 provided as a user interface for focusing on or zooming-in on various portions of the enlarged visual representation 215a within enlarged view 220. As the zoom tool 225 traverses the contents of enlarged view 220, the portion currently under view of the zoom tool 225 is displayed within the zoomed view 230. While details of the zoom tool are not described herein, one of ordinary skill in the art can appreciate that zoom tools are familiar to one of ordinary skill in the art and can be implemented as a function of the e-commerce application 114 of FIG. 1.

As the consumer focuses on or zooms-in on various features of the product, while viewing any one of the plurality of visual representations 215a-215f, the e-commerce application 114 of FIG. 1, illustrated here as a webpage or a rendering of product page 200, can be configured to monitor durations in which the consumer is interacting with (e.g., requesting enlarged versions of, focusing on, or zooming in on portions of) depicted features of the product. In more detail, the interaction monitoring component 116 of FIG. 1 can be configured to execute or render dynamic code configured to monitor interaction times between the consumer and each of one or more feature-tagged regions of the one or more visual representations of the product. As was detailed herein above, one or more of the visual representations of the marketer's product(s) can each be divided into regions and tagged with feature keywords selected from a product feature taxonomy associated with the relevant category of the product(s).

In the example illustration of FIG. 2B, it is contemplated that at least some of the visual representations 215a-215f of the cell phone case have been divided up into regions and tagged with relevant features such as, among others, "rhinestones" or "logo display," as will be described. It is further contemplated that, and by way of example only, the portions of the case encrusted with rhinestones is tagged with the feature tag "rhinestone," while the portion of the case having a logo display is tagged with the feature tag "logo display," as will be described. In this regard, as the consumer zooms in on any one of the visual representations of the cell phone case, such as that of 215a, to focus particularly on a region tagged with "rhinestone," the interaction monitoring component 116 can be configured to measure the duration of time (e.g., 5 seconds) that the consumer spent viewing, focusing on, or zooming-in on the region tagged with "rhinestone."

Moving now to FIG. 2C, another exemplary visual representation 215e is presented within enlarged view 220. As illustrated, the enlarged visual representation 215e within enlarged view 220 depicts in detail some of the features relevant to the product, in this instance, the decorations (e.g., rhinestones) of the cell phone case, as was similarly depicted in the previous view 215a, along with a hole in the case to display the cell phone logo. As was previously contemplated, various regions of visual representation 215e can be tagged with feature keywords selected from the product feature taxonomy associated with the product's category. Similar to the example of FIG. 2B, the rhinestone encrusted portions of the illustrated cell phone case is assumed to be tagged with the feature tag "rhinestone," while the hole configured to display the cell phone logo is tagged with the feature tag "logo display." As the consumer zooms in on the expanded view 220 of the visual representation 215e, particularly focusing in on the region tagged with "logo display," the interaction monitoring component 116 of FIG. 1 can be configured to measure the duration of time (e.g., 3 seconds) that the consumer spends viewing, focusing on, or zooming-in on the region tagged with "logo display."

As the consumer interacts with various tagged regions of various visual representations of a product, the interaction monitoring component 116 can be configured to communicate the consumer-product interaction measurements to the server 130 of FIG. 1. As was described, the communications of such measurements can be performed in real-time, in predetermined intervals, or programmatically. Depending on how the server 130 or upsell recommendation engine 134 is configured to interpret measurement data, the measurements can include, in addition to temporal measurements, one or more of identifiers of visual representations viewed, coordinates of a visual representation viewed, and/or identifiers of regions that were viewed. In some embodiments, the server 130 can be configured to store a consumer's product interaction measurements to a master marketing profile associated with the consumer's user account to maintain a feature interest profile associated with the consumer. In other words, the consumer's profile can maintain information that indicates features that the consumer is particularly interested in, based on the consumer's interaction times with such features. The consumer's master marketing profile can include a sum of time spent on each or any feature tag associated with a product feature taxonomy. In this regard, if the consumer spent a total of five seconds viewing the rhinestones in view 215a of FIG. 2B, and a total of eight seconds viewing the rhinestones in view 215e of FIG. 2C, the consumer's master marketing profile may include a record indicating that a total of thirteen seconds was spent by the consumer interacting with the feature tag "rhinestone." In this regard, in some embodiments, the consumer's master marketing profile can be analyzed to modify product upsell recommendations based on features that appear to be of particular importance to the consumer based on his/her product interaction history. In some other embodiments, all consumer master marketing profiles having some consumer-product interaction data corresponding to a product feature taxonomy can be aggregated to further modify product upsell recommendations, as will be described.

Figure 3A:
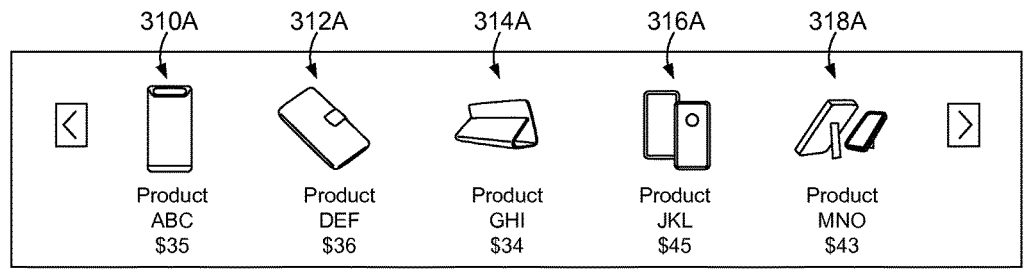
FIGS. 3A-3C illustrate exemplary sets of upsell recommendations generated by an upsell recommendation engine in accordance with implementations of the present disclosure.
Figure 3B:
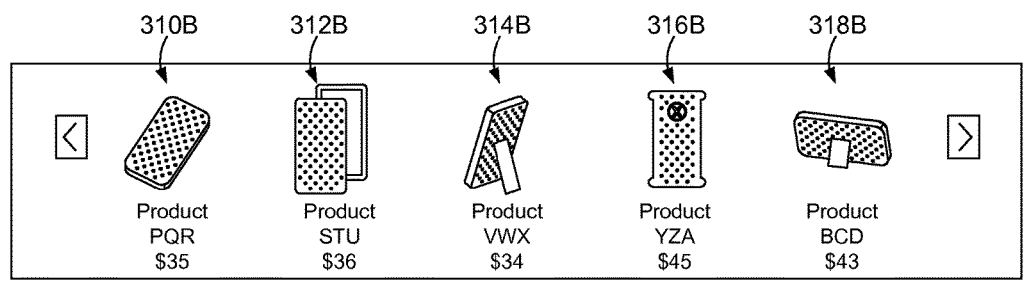
Figure 3C:
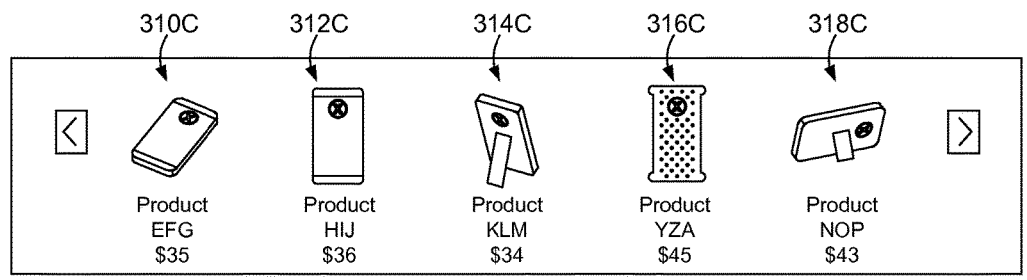

Looking now at FIGS. 3A-3C, various sets of upsell recommendations 300a-300c are provided, similar to the set of upsell recommendations 250 of FIGS. 2A-2C. FIG. 3A depicts an exemplary set of upsell recommendations 300a that may be generated by upsell recommendation engines disclosed in the prior art. More specifically, the products depicted in the set of upsell recommendations 300a, while having relevance to the product category associated with a currently viewed product (such as the cell phone case of product page 200 of FIGS. 2A-2C) do not appear to have any particular relevance to features that an active consumer might be interested in. Upsell recommendation engines have traditionally relied on site wide purchase history, consumer viewing history, manufacturer-specific filters, and the like, when generating and/or modifying product recommendations for presentation to a consumer.

Moving now to FIGS. 3B-3C, sets of upsell recommendations 300b-300c are provided, depicting exemplary sets of upsell recommendations 300b-300c that can be generated by an upsell recommendation engine in accordance with embodiments of the present disclosure. More specifically, the sets of upsell recommendations 300b-300c illustrate that the upsell recommendations generated by embodiments of the present disclosure appear to have relevance to the consumer, whereby each recommended product in the sets of upsell recommendations 300b-300c also include features that the consumer may have shown particular interest in when having interacted with feature-tagged regions of other products in the same category.

With specific reference to FIG. 3B, in light of FIG. 2B, FIG. 3B depicts an exemplary set of upsell recommendations 300b including product recommendations 310b, 312b, 314b, 316b, 318b. While the figure provides an exemplary set of upsell recommendations 300b, it is contemplated that embodiments described herein are not necessarily limited to upsell recommendations, but can also include recommendations generally (i.e., higher-priced, similarly-priced and/or lesser-priced product recommendations). In the illustrated example, each product recommendation 310b-318b in the set 300b appears to have a common feature, more specifically, each product in the set 300b includes rhinestones as a feature. When compared to the set of upsell recommendations 300a of FIG. 3A, FIG. 3A portrays a seemingly generic set of upsell recommendations 300a. The product recommendations of FIG. 3A may have some relevance to the consumer, such as being part of the same category of the product page being viewed, or having been purchased by other consumers in the past. While the consumer may be interested in what other consumers have purchased, the consumer may also have a higher likelihood on viewing and/or purchasing upsell recommendations having features that are relevant to their search. To this end, as consumer is viewing the product page depicted in FIG. 2B, the interaction monitoring component 116 of FIG. 1 may monitor the consumer's interaction with the visual representation 215a, and measure a duration of time the consumer interacts with regions tagged with feature tag "rhinestone." Assuming that the totality of time that the consumer interacting with regions tagged with feature tag "rhinestone" exceeds the totality of time that the consumer interacts with regions tagged otherwise (for instance "logo display"), the subsequent rendering of the set of product recommendations may include a new or modified set of product recommendations particularly featuring rhinestones, the new or modified set being based at least partially on the monitored interaction times of the consumer.

Looking now at FIG. 3C, in light of FIG. 2C, FIG. 3C depicts an exemplary set of upsell recommendations 300c including product recommendations 310c, 312c, 314c, 316c, 318c. Once again, while the figure provides an exemplary set of upsell recommendations 300c, it is contemplated that embodiments described herein are not necessarily limited to upsell recommendations, but can also include recommendations generally (i.e., higher-priced, similarly-priced and/or lesser-priced product recommendations). In the illustrated example, each product recommendation 310c-318c in the set 300c appears to have a common feature, more specifically; each product in the set 300c includes a hole for the cell phone logo as a feature. When compared to the set of upsell recommendations 300a of FIG. 3A, FIG. 3A once again portrays a seemingly generic set of upsell recommendations 300a. While a consumer is viewing the product page depicted in FIG. 2C, the interaction monitoring component 116 of FIG. 1 may monitor the consumer's interaction with the visual representation 215e, and measure a duration of time the consumer interacts with regions tagged with feature tag "logo display." Assuming that the totality of time that the consumer interacting with regions tagged with feature tag "logo display" exceeds the totality of time that the consumer interacts with regions tagged otherwise (for instance "rhinestone"), the subsequent rendering of the set of product recommendations may include a new or modified set of product recommendations particularly featuring holes for viewing the cell phone logo, the new or modified set being based at least partially on the monitored interaction times of the consumer.

In embodiments, modification of the set of product recommendations by the upsell recommendation engine 134 of FIG. 1 can be based on a summation of scores associated with various data sources stored in memory 138 of server 130. The data sources can include an active consumer's master marketing profile, a plurality of consumers' master marketing profiles, purchase history of one or more consumers, viewing history of one or more consumers, manufacturer catalogs, and/or live consumer-product interaction data. In this regard, at least some consumer-product interaction data is utilized when modifying a set of product recommendations associated with a category of goods being viewed and/or searched by a consumer.

Figure 4:
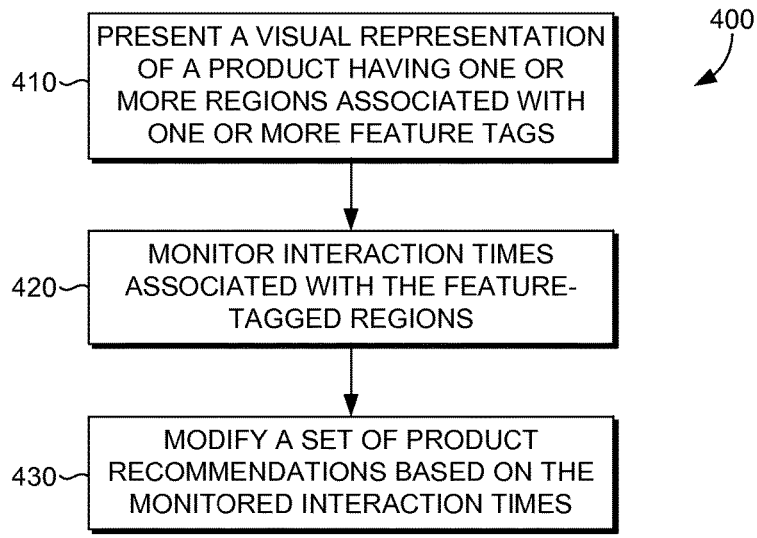
FIG. 4 is a flow diagram showing a method for improving upsell recommendations to online consumers using consumer-product interaction data, in accordance with implementations of the present disclosure.

Having described various aspects of the present disclosure, exemplary methods are described below for improving upsell recommendations. Referring to FIG. 4 in light of FIGS. 1-3, FIG. 4 is a flow diagram showing a method 400 for improving upsell recommendations to online consumers using consumer-product interaction data. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, a visual representation of a product, such as an image, three-dimensional model, or video, is presented to a consumer on an e-commerce application, for instance, e-commerce application 114 of FIG. 1. The visual representation can have one or more regions defined by a marketer or operator, that are each associated with one or more feature tags associated with a category of the product. At block 420, consumer-product interaction times are monitored, for instance, by interaction monitoring component 116 of FIG. 1. The consumer-product interaction times are durational measurements of a consumer's focused interaction (e.g., zooming, expanding, etc.) with each of the one or more feature-tagged regions of the visual representation. At block 430, a set of product recommendations associated with the category of the product is generated and/or modified, for instance, by upsell recommendation engine 134 of FIG. 1. Generation and/or modification of the set of product recommendations is based on the monitored consumer interaction time associated with each of the one or more feature-tagged regions of the visual representation.

Figure 5:
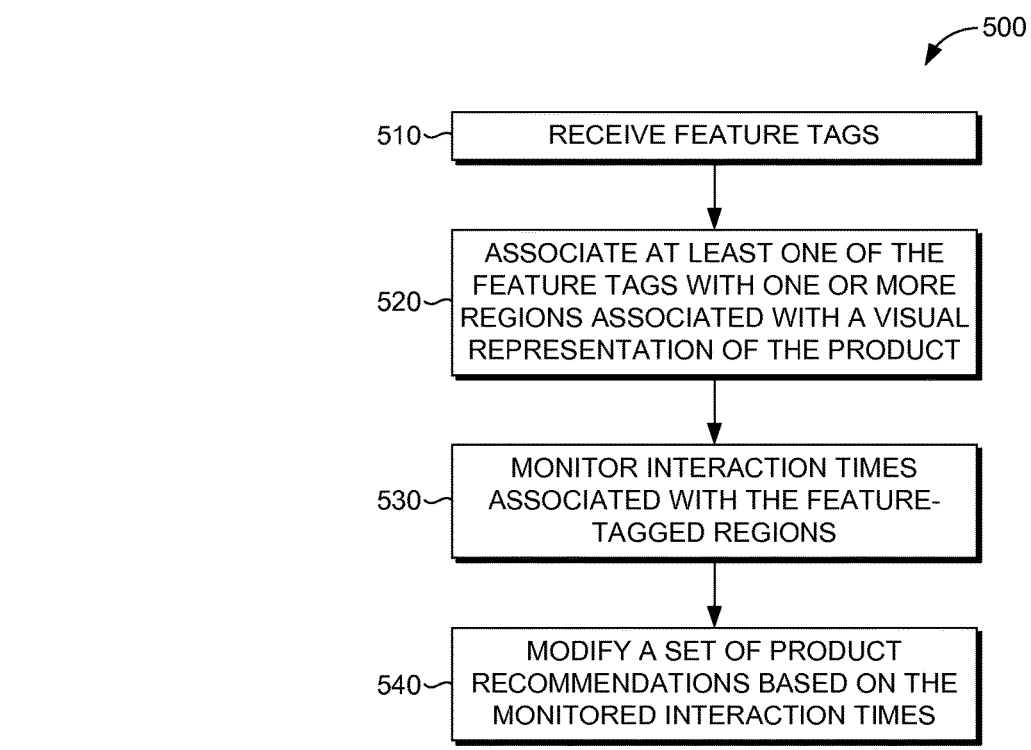
FIG. 5 is a flow diagram showing a method for improving upsell recommendations to online consumers using consumer-product interaction data, in accordance with implementations of the present disclosure.

Referring now to FIG. 5, in light of FIGS. 1-3, FIG. 5 is a flow diagram showing a method 500 for improving upsell recommendations to online consumers using consumer-product interaction data. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, a plurality of feature tags associated with a category of a product is received. In some embodiments, the feature tags can be manually input by a marketer operator. In other embodiments, the feature tags can be automatically generated, for instance, by a natural language processing engine of feature tag generation component 137. At block 520, at least one of the plurality of feature tags is associated with one or more regions associated with a visual representation of the product. At block 530, interaction times associated with each of the one or more feature-tagged regions of the visual representation is monitored, for instance, by interaction monitoring component 116 of FIG. 1. At block 540, a set of product recommendations associated with the category of the product is generated and/or modified, for instance, by upsell recommendation engine 134 of FIG. 1. Generation and/or modification of the set of product recommendations is based at least on the monitored interaction times associated with each of the one or more feature-tagged regions of the visual representation.

Figure 6:
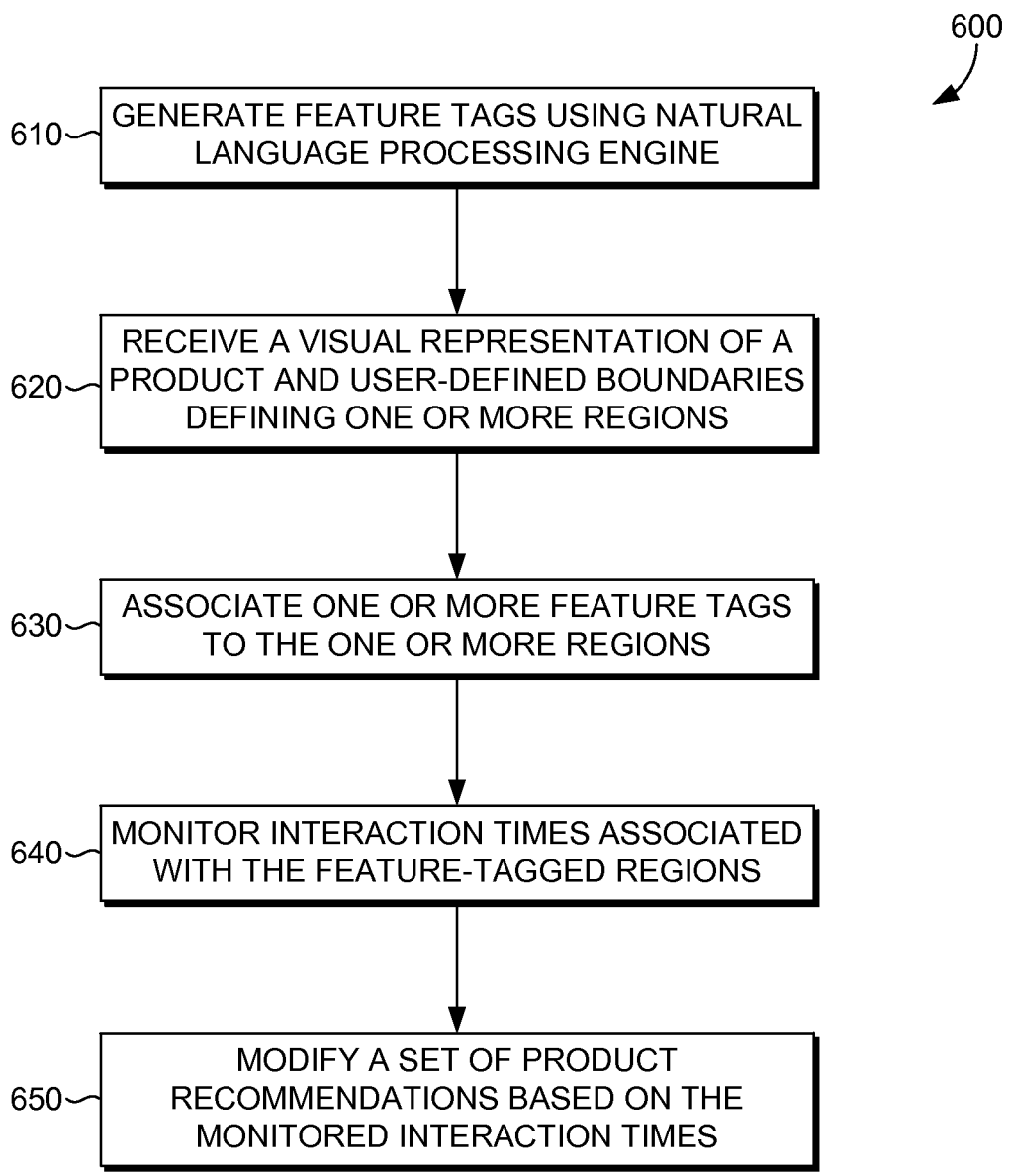
FIG. 6 is a flow diagram showing a method for improving upsell recommendations to online consumers using consumer-product interaction data, in accordance with implementations of the present disclosure.

Referring now to FIG. 6, in light of FIGS. 1-3, FIG. 6 is a flow diagram showing a method 600 for improving upsell recommendations to online consumers using consumer-product interaction data. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 610, a plurality of feature tags associated with a product category is generated. The feature tags can be generated using a natural language processing engine configured to generate the plurality of feature tags by identifying and/or ranking keywords from one or more product pages associated with the product category, as described with respect to feature tag generation component 137 of FIG. 1. At block 620, a visual representation of a product is received through, for instance, an administrative portal of the e-commerce web service 132 of FIG. 1. During or after receipt of the visual representation, operator-defined boundaries defining the one or more regions associated with the visual representation of the product are received. At block 630, one or more of the plurality of feature tags associated with the product category is associated with one or more of the regions defined by the consumer-defined boundaries. At block 640, interaction times associated with each of the one or more feature-tagged regions of the visual representation is monitored, for instance, by interaction monitoring component 116 of FIG. 1. At block 650, a set of product recommendations associated with the category of the product is generated and/or modified. Generation and/or modification of the set of product recommendations is based at least on the monitored interaction times associated with each of the one or more feature-tagged regions of the visual representation.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As described above, implementations of the present disclosure provide for improving upsell recommendations to online consumers using consumer-product interaction data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
providing a user interface, via an administration portal, wherein the user interface is configured to receive user inputs that define at least one region associated with a visual representation of the product;
receiving a set of user-defined boundaries that correspond to the stored visual representation of a product, wherein the set of user-defined boundaries define at least one region of the stored visual representation;
providing for display, to a remote client device, the visual representation of a selected product, the visual representation having the at least one user-defined region associated with at least one defined feature tag, each defined feature tag corresponding to one of a set of defined categories associated with the selected product;
determining at least one interaction time that corresponds to one of the at least one user-defined feature-tagged region of the visual representation and a determined duration that the corresponding the user-defined feature-tagged region was provided for focused display by the remote client device; and
generating a set of product recommendations for communication to the remote client device, each product recommendation in the set being generated based on one of the at least one determined interaction times and the at least one defined feature tags associated with the corresponding user-defined feature-tagged region.

2. The computer storage medium of claim 1, wherein each feature tag of the at least one defined feature tag is selected from a product feature taxonomy.

3. The computer storage medium of claim 2, wherein the product feature taxonomy is generated by a natural language processing engine that identifies feature keywords from at least one product page associated with at least one defined category of the set of defined categories.

4. The computer storage medium of claim 1, wherein the displayed visual representation is one of an image of the selected product, a three-dimensional model of the selected product, and a video presentation of the selected product.

5. The computer storage medium of claim 1, wherein a user-defined feature-tagged region is provided for focused display when the user-defined feature-tagged region is provided for display under zoom, in solidarity, or in a paused video frame.

6. The computer storage medium of claim 1, further comprising supplementing a master marketing profile associated with the remote client device a with the at least one determined interaction times to generate a weighted map of features that corresponds at least in part to the set of defined categories associated with the selected product.

7. A computer-implemented method for improving upsell recommendations, the method comprising:
providing a user interface, via an administration portal, wherein the user interface is configured to receive user inputs that define at least one region associated with a visual representation of the product;
receiving a set of user-defined boundaries that correspond to a stored visual representation of a product, wherein the set of user-defined boundaries define at least one region of the stored visual representation;
receiving, by a server device, a set of defined feature tags that each corresponds to one of a set of defined categories associated with a selected product; assigning, by the server device, each defined feature tag to the at least one user-defined region in a set of regions defined for the stored visual representation of the product;
associating at least one of the plurality of feature tags with the one or more user-defined regions associated with a visual representation of the product;
receiving, by the server device, at least one detected interaction time that each corresponds to one of the at least one user-defined feature-tagged region of the stored visual representation; and generating, by the server device, a set of product recommendations based on the received at least one detected interaction time, each product recommendation in the set being generated based on one of the received at least one detected interaction time and the at least one defined feature tag associated with the corresponding user-defined feature-tagged region.

8. The computer-implemented method of claim 7, wherein the set of defined feature tags are received based on feature keywords identified in at least one product page associated with the set of defined categories associated with the selected product.

9. The computer-implemented method of claim 7, wherein the set of defined feature tags is received based on at least one input received via a graphical user interface.

10. The computer-implemented method of claim 7, wherein each detected interaction time in the at least one detected interaction time is received via a retailer website or application and includes an identifier of the corresponding user-defined feature-tagged region and a determined duration that the corresponding user-defined feature-tagged region was displayed in a focused state on the retailer website or application.

11. The computer-implemented method of claim 7, wherein the at least one detected interaction time is received from a remote client device having the stored visual representation displayed thereby.

12. The computer-implemented method of claim 11, wherein the set of product recommendations is generated based further on previously received detected interaction times that correspond to at least a portion of the user-defined feature-tagged regions.

13. A computerized system comprising: one or more processors; and
one or more computer storage media storing computer-usable instructions that, when used by the one or more processors, cause the one or more processors to:
employ a natural language processing to generate a plurality of feature tags associated with a defined product category based on keywords identified from a set of product pages associated with the defined product category;
provide a user interface, via an administration portal, wherein the user interface is configured to receive user inputs that define at least one region associated with a visual representation of the product;
receive a set of user-defined boundaries that correspond to the stored visual representation of a product, wherein the set of user-defined boundaries define at least one region of the stored visual representation;
associate one or more of the plurality of feature tags associated with the product category to the one or more regions;
tag at least one of the defined at least one region with at least one of the generated plurality of feature tags;
receive, from a remote client device accessing the stored visual representation, at least one detected interaction time that each corresponds to one of the tagged at least one region based on the corresponding tagged region being provided for display in a focused state by the remote client device; and
in accordance with a display of the visual representation of the product, obtain interaction times associated with at least one of the one or more feature-tagged regions of the visual representation; and
generate a set of product recommendations based at least on the received at least one detected interaction time, each product recommendation in the set being generated based on a corresponding one of the received at least one detected interaction time and the at least one feature tag associated with the corresponding tagged region.

14. The system of claim 13, wherein each product recommendation in the generated set of product recommendations is ranked based on the corresponding detected interaction time.

15. The system of claim 13, wherein the natural language processing engine is trained with a domain-specific dictionary.

16. The system of claim 13, wherein each defined at least one region corresponds to one of a set of features of the product.

17. The system of claim 13, wherein the focused state corresponds to when the corresponding tagged region is provided for display as zoomed in on, paused on, or independent of any other tagged region.

* * * * *